(12) United States Patent
Tavildar et al.

(10) Patent No.: US 10,798,627 B2
(45) Date of Patent: Oct. 6, 2020

(54) USER EQUIPMENT CENTRIC MOBILITY (UECM) IN RADIO RESOURCE CONTROL (RRC) DEDICATED MODE

(71) Applicant: QUALCOMM Incorporated, San Diego, CA (US)

(72) Inventors: Saurabha Rangrao Tavildar, Jersey City, NJ (US); Tingfang Ji, San Diego, CA (US); Gavin Bernard Horn, La Jolla, CA (US); Keiichi Kubota, San Diego, CA (US); Ravi Agarwal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 556 days.

(21) Appl. No.: 15/258,555

(22) Filed: Sep. 7, 2016

(65) Prior Publication Data

US 2017/0230875 A1   Aug. 10, 2017

Related U.S. Application Data

(60) Provisional application No. 62/293,036, filed on Feb. 9, 2016.

(51) Int. Cl.
*H04W 36/08* (2009.01)
*H04W 36/00* (2009.01)
*H04W 36/30* (2009.01)

(52) U.S. Cl.
CPC ....... *H04W 36/08* (2013.01); *H04W 36/0085* (2018.08); *H04W 36/30* (2013.01)

(58) Field of Classification Search
CPC .. H04W 36/08; H04W 36/0085; H04W 36/30
See application file for complete search history.

(56) References Cited

U.S. PATENT DOCUMENTS 8,837,290 B2   9/2014   Dimou et al.
9,332,474 B2   5/2016   Sun et al.
(Continued)

FOREIGN PATENT DOCUMENTS

WO        2013040743 A1    3/2013
WO    WO-2015005463 A1    1/2015
(Continued)

OTHER PUBLICATIONS

International Search Report and Written Opinion—PCT/US2017/012715—ISA/EPO—dated Apr. 12, 2017.

*Primary Examiner* — Kevin C. Harper
(74) *Attorney, Agent, or Firm* — Patterson & Sheridan, L.L.P.

(57) ABSTRACT

Aspects of the present disclosure provide methods and apparatus for transmitting an uplink reference signal, receiving a keep alive (KA) command based, at least in part, on the uplink reference signal, and taking one or more actions to perform a handover to a non-serving base station (BS) in accordance with the KA command. Additionally, aspects provide methods and apparatus for receiving an uplink reference signal from a user equipment (UE), measuring the uplink reference signal, and transmitting a KA command to the UE based, at least in part, on the measured uplink reference signal. The KA command may be scrambled by an identifier associated with the UE. Additionally or alternatively, a cyclic prefix (CP) of the uplink reference signal may be longer than a CP of another type of reference signal.

22 Claims, 14 Drawing Sheets

(56) References Cited

U.S. PATENT DOCUMENTS

| | | | |
|---|---|---|---|
| 2007/0032237 A1* | 2/2007 | Chang | H04W 36/0085 455/436 |
| 2007/0213059 A1* | 9/2007 | Shaheen | H04W 36/0033 455/436 |
| 2008/0182579 A1* | 7/2008 | Wang | H04W 36/0077 455/436 |
| 2009/0028112 A1* | 1/2009 | Attar | H04W 36/245 370/332 |
| 2009/0220087 A1* | 9/2009 | Brusilovsky | H04L 63/062 380/272 |
| 2009/0247229 A1 | 10/2009 | Teo et al. | |
| 2011/0268028 A1* | 11/2011 | Stern-Berkowitz | H04L 5/0048 370/328 |
| 2011/0271169 A1* | 11/2011 | Pi | H03M 13/09 714/807 |
| 2011/0306347 A1 | 12/2011 | Choi et al. | |
| 2012/0026976 A1* | 2/2012 | Chang | H04L 5/001 370/331 |
| 2013/0308473 A1* | 11/2013 | Sun | H04W 36/30 370/252 |
| 2013/0322280 A1* | 12/2013 | Pi | H04W 72/0413 370/252 |
| 2014/0036737 A1* | 2/2014 | Ekpenyong | H04W 8/245 370/280 |
| 2015/0003311 A1 | 1/2015 | Feuersaenger et al. | |
| 2016/0021591 A1 | 1/2016 | Lin et al. | |
| 2016/0128006 A1 | 5/2016 | Ji et al. | |
| 2016/0135147 A1 | 5/2016 | Ouchi et al. | |
| 2017/0202053 A1* | 7/2017 | Rune | H04W 74/0833 |

FOREIGN PATENT DOCUMENTS

| | | |
|---|---|---|
| WO | 2015051837 A1 | 4/2015 |
| WO | 2016003336 A1 | 1/2016 |

\* cited by examiner

USER EQUIPMENT CENTRIC MOBILITY (UECM) IN RADIO RESOURCE CONTROL (RRC) DEDICATED MODE

CROSS-REFERENCE TO RELATED APPLICATIONS

This application claims benefit of U.S. Provisional Application Ser. No. 62/293,036, filed Feb. 9, 2016 entitled "USER EQUIPMENT CENTRIC MOBILITY (UECM) IN RADIO RESOURCE CONTROL (RRC) DEDICATED MODE," which is hereby expressly incorporated by reference herein in its entirety.

FIELD

The present disclosure generally relates to wireless communications and, more particularly, but not exclusively, to efficient handover framework for user-centric networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

Some wireless communication standards have based user equipment handoff decisions based on downlink measurements. Future generation wireless communication may focus on user-centric networks. Accordingly, it may be desirable to have an efficient handover framework for user-centric networks.

SUMMARY

Certain aspects of the present disclosure provide a method for wireless communication by a user equipment (UE). The method generally includes transmitting an uplink reference signal, receiving a keep alive (KA) command based, at least in part, on the uplink reference signal, wherein the KA command is scrambled by an identifier associated with the UE, and taking one or more actions to perform a handover to a non-serving base station (BS) in accordance with the KA command.

Certain aspects of the present disclosure provide an apparatus for wireless communication by a user equipment (UE). The apparatus generally includes means for transmitting an uplink reference signal, means for receiving a keep alive (KA) based, at least in part, on the uplink reference signal, wherein the KA command is scrambled by an identifier associated with the UE, and means for taking one or more actions to perform a handover to a non-serving base station (BS) in accordance with the KA command.

Certain aspects of the present disclosure provide an apparatus for wireless communication by a user equipment (UE). The apparatus generally includes at least one processor and a memory coupled with the at least one processor. The at least one processor is generally configured to transmit an uplink reference signal, receive a keep alive (KA) command based, at least in part, on the uplink reference signal, wherein the KA command is scrambled by an identifier associated with the UE, and take one or more actions to perform a handover to a non-serving base station (BS) in accordance with the KA command.

Certain aspects of the present disclosure provide a computer readable medium storing computer executable code for causing a user equipment (UE) to transmit an uplink reference signal, receive a keep alive (KA) command based, at least in part, on the uplink reference signal, wherein the KA command is scrambled by an identifier associated with the UE, and take one or more actions to perform a handover to a non-serving base station (BS) in accordance with the KA command.

Certain aspects of the present disclosure provide a method for wireless communication by a first base station (BS). The method generally includes receiving an uplink reference signal from a user equipment (UE), measuring the uplink reference signal, and transmitting a keep alive (KA) command to the UE based, at least in part, on the measured uplink reference signal, wherein the KA command is scrambled by an identifier associated with the UE.

Certain aspects of the present disclosure provide an apparatus for wireless communication by a first base station (BS). The apparatus generally includes means for receiving an uplink reference signal from a user equipment (UE), means for measuring the uplink reference signal, and means for transmitting a keep alive (KA) command to the UE based, at least in part, on the measured uplink reference signal, wherein the KA command is scrambled by an identifier associated with the UE.

Certain aspects of the present disclosure provide an apparatus for wireless communication by a first base station (BS). The apparatus generally includes at least one processor and a memory coupled with the at least one processor. The at least one processor is generally configured to receive an uplink reference signal from a user equipment (UE), measure the uplink reference signal, and transmit a keep alive (KA) command to the UE based, at least in part, on the measured uplink reference signal, wherein the KA command is scrambled by an identifier associated with the UE.

Certain aspects of the present disclosure provide a computer readable medium storing computer executable code for causing a first base station (BS) to receive an uplink reference signal from a user equipment (UE), measure the uplink reference signal, and transmit a keep alive (KA) command to the UE based, at least in part, on the measured uplink reference signal, wherein the KA command is scrambled by an identifier associated with the UE.

Certain aspects of the present disclosure provide a method for wireless communication by a user equipment. The method generally includes transmitting an uplink reference signal, wherein a cyclic prefix (CP) of the uplink reference signal is longer than a CP of another type of reference signal, receiving a keep alive (KA) command based, at least in part, on the uplink reference signal, and taking one or more actions to perform a handover to a non-serving base station (BS) in accordance with the KA command.

Certain aspects of the present disclosure provide an apparatus for wireless communication by a user equipment. The apparatus generally includes means for transmitting an uplink reference signal, wherein a cyclic prefix (CP) of the uplink reference signal is longer than a CP of another type of reference signal, means for receiving a keep alive (KA) command based, at least in part, on the uplink reference signal, and means for taking one or more actions to perform a handover to a non-serving base station (BS) in accordance with the KA command.

Certain aspects of the present disclosure provide an apparatus for wireless communication by a user equipment. The apparatus generally includes at least one processor and a memory coupled with the at least one processor. The at least one processor is generally configured to transmit an uplink reference signal, wherein a cyclic prefix (CP) of the uplink reference signal is longer than a CP of another type of reference signal, receive a keep alive (KA) command based, at least in part, on the uplink reference signal, and take one or more actions to perform a handover to a non-serving base station (BS) in accordance with the KA command.

Certain aspects of the present disclosure provide a computer readable medium storing computer executable code for causing a user equipment (UE) to transmit an uplink reference signal, wherein a cyclic prefix (CP) of the uplink reference signal is longer than a CP of another type of reference signal, receive a keep alive (KA) command based, at least in part, on the uplink reference signal, and take one or more actions to perform a handover to a non-serving base station (BS) in accordance with the KA command.

Certain aspects of the present disclosure provide a method for wireless communication by a first base station (BS). The method generally includes receiving an uplink reference signal from a user equipment (UE), wherein a cyclic prefix (CP) of the uplink reference signal is longer than a CP of another type of reference signal, measuring the uplink reference signal, and transmitting a keep alive (KA) command to the UE based, at least in part, on the measured uplink reference signal.

Certain aspects of the present disclosure provide an apparatus for wireless communication by a first base station (BS). The apparatus generally includes means for receiving an uplink reference signal from a user equipment (UE), wherein a cyclic prefix (CP) of the uplink reference signal is longer than a CP of another type of reference signal, means for measuring the uplink reference signal, and means for transmitting a keep alive (KA) command to the UE based, at least in part, on the measured uplink reference signal.

Certain aspects of the present disclosure provide an apparatus for wireless communication by a first base station (BS). The apparatus generally includes at least one processor and a memory coupled with the at least one processor. The at least one processor is generally configured to receive an uplink reference signal from a user equipment (UE), wherein a cyclic prefix (CP) of the uplink reference signal is longer than a CP of another type of reference signal, measure the uplink reference signal, and transmit a keep alive (KA) command to the UE based, at least in part, on the measured uplink reference signal.

Certain aspects of the present disclosure provide a computer readable medium storing computer executable code for causing a first base station (BS) to receive an uplink reference signal from a user equipment (UE), wherein a cyclic prefix (CP) of the uplink reference signal is longer than a CP of another type of reference signal, measure the uplink reference signal, and transmit a keep alive (KA) command to the UE based, at least in part, on the measured uplink reference signal.

Aspects generally include methods, apparatus, systems, computer program products, computer readable mediums, and processing systems, as substantially described herein with reference to and as illustrated by the accompanying drawings.

Other aspects, features, and examples of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

DETAILED DESCRIPTION

Figure 1:
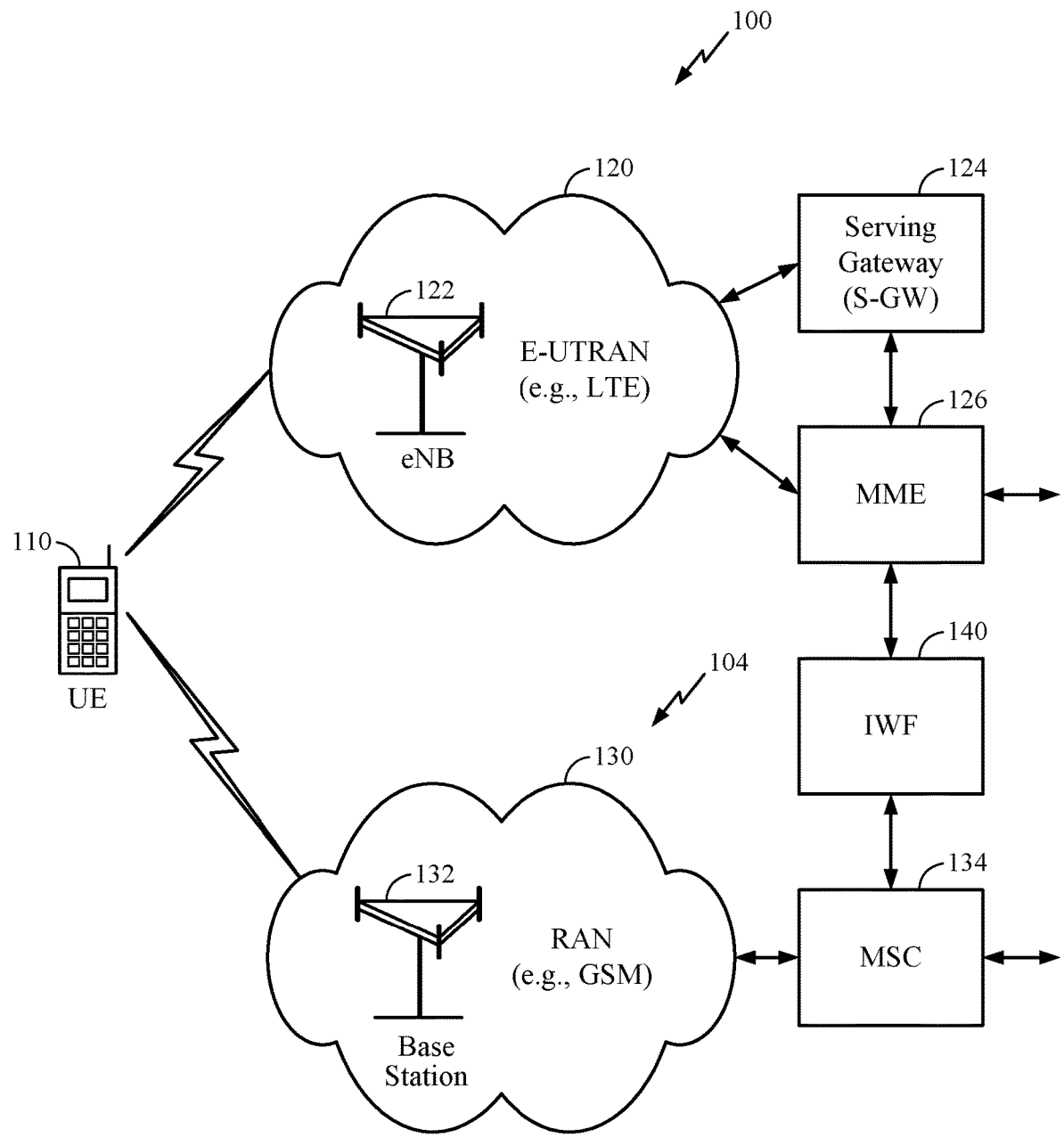
FIG. 1 illustrates an exemplary deployment in which multiple wireless networks have overlapping coverage.

Aspects of the present disclosure provide techniques and apparatus for performing a time and resource-efficient handover procedure. A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, access point (AP), radio head, smart radio head (SRH), transmit receive point (TRP), etc. In some cases, a BS may include a combination of such elements.

5G and other future communications systems may focus on creating a more user-centric network. As described herein, handovers may be performed based, at least in part, on uplink signal measurements taken by base stations. Aspects of the present disclosure provide a framework for (forward and backward) handover based on uplink measurements.

In one aspect, an UE may transmit an uplink reference signal, receive a keep alive (KA) command based, at least in part, on the uplink reference signal, and take one or more actions to perform a handover to a non-serving BS in accordance with the KA command. According to aspects, the KA command may be scrambled by an identifier associated with the UE. Additionally or alternatively, the cyclic prefix (CP) of the uplink reference signal may be longer than a CP of another type of reference signal. As will be described in more detail herein, a longer CP may allow for one or more non-serving BSs (e.g., a target BS not serving the UE) to more reliably receive the uplink reference signal.

A first BS, which may be a BS serving the UE (e.g., source BS) or a BS not serving the UE (e.g., target BS) may receive an uplink reference signal from a UE, measure the uplink reference signal, and transmit a KA command to the UE based, at least in part, on the measured uplink reference signal. Advantageously, the KA command may be transmitted to the UE by one of the serving or non-serving BSs. The KA command may be scrambled by an identifier associated with the UE. Additionally or alternatively, the uplink reference signal received by serving and/or non-serving BSs may have a longer CP as compared to another type of reference signal. The longer CP may allow for the non-serving BS to more reliably receive and decode the uplink reference signal.

Advantageously, the UE may receive a configuration for the uplink reference signal from the serving BS (e.g., a source BS). A non-serving BS (e.g., a target BS) may receive the configuration for the uplink reference signal from the serving BS. In this manner, the UE may transmit the uplink reference signal that advantageously may be received by both the serving BS and the non-serving BS. As described herein, either the source/serving BS or the target/non-serving BS may transmit a KA command and/or connection reconfiguration message based, at least in part, on measurements of the received uplink reference signal.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product and/or computer readable medium for performing the operations presented herein. According to aspects, a computer program product may comprise a computer readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1× radio transmission technology (1×RTT), CDMA2000 1×, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

It is noted that while aspects may be described herein using terminology commonly associated with 3G and/or 4G wireless technologies, aspects of the present disclosure can be applied in other generation-based communication systems, such as 5G and later, including new radio (NR) technologies.

NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR BS (e.g., 5G Node B or NR Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals (SS); in some case cases DCells may transmit SS. Base stations (e.g., TRPs) may transmit downlink signals to UEs indicating the cell type. Based on the cell type indication, the UE may communicate with the base station. For example, the UE may determine base stations to consider for cell selection, access, handover, and/or measurement based on the indicated cell type.

FIG. 1 illustrates an example deployment in which aspects of the present disclosure may be implemented. For example, a UE 110 may transmit an uplink reference signal, receive a keep alive (KA) command based, at least in part, on the uplink reference signal, and take one or more actions to perform a handover to a non-serving BS (target BS/target TRP/target "cell") in accordance with the KA command. According to aspects, the KA command may be scrambled by an identifier associated with the UE. Additionally or alternatively, according to aspects, the uplink reference signal transmitted by the UE 110 may have a longer CP than the CP of another type of reference signal. A longer CP may facilitate reception of the uplink reference signal by one or more BSs not serving the UE that is transmitting the uplink reference signal.

For example, as shown in FIG. 1, a first BS 132 or BS 122, which may be a base station serving the UE or a non-serving base station may receive an uplink reference signal from a UE 110, measure the uplink reference signal, and transmit a KA command to the UE based, at least in part, on the measured uplink reference signal. According to aspects, the first BS 132 or 122 may scramble the KA command with an identifier associated with the UE. Additionally or alternatively, according to aspects, the uplink reference signal transmitted by the UE 110 may have a longer CP as compared a CP of another type of reference signal (e.g., another type of uplink or a non-uplink reference signal).

The UE may receive a configuration for the uplink reference signal from the serving BS. A non-serving BS (e.g., a target TRP/target "cell") may also receive the configuration for the uplink reference signal from the serving BS. In this manner, the UE may transmit the uplink reference signal to both the serving BS and the non-serving BS. As described herein, advantageously, either the serving BS (e.g., source BS) or the non-serving BS (e.g., target BS) may transmit a KA command and/or connection reconfiguration message based, at least in part, on measurements of the received uplink reference signal. The KA command may be scrambled with an identifier associated with the UE.

FIG. 1 shows an exemplary deployment in which multiple wireless networks have overlapping coverage. A radio access network such as an evolved universal terrestrial radio access network (E-UTRAN) 120 may support LTE and may include a number of Node Bs (NBs) 122 and other network entities that can support wireless communication for user equipments (UEs). Each NB may provide communication coverage for a particular geographic area. The term "cell" can refer to a coverage area of a BS (e.g., TRP, NB and/or an NB subsystem serving this coverage area). A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 100. RAN 130 and MSC 134 may be part of a GSM network 104. For simplicity, FIG. 1 shows only some network entities in the LTE network 100 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

While the system illustrated in FIG. 1 includes a Long Term Evolution (LTE) network 120 and a GMS network 130, in some cases, the system may include one or more other networks, such as a NR network. The NR may include may include a number of NR BSs (e.g., Node B, evolved Node B (eNB), 5G Node B, TRP etc.) as an alternative (or in addition to) LTE eNB 122 and/or GSM BS 132. A BS may be a station that communicates with the UEs and may also be referred to as an access point, etc. A Node B, AP, TRP, radio head, NR Node B, and 5G Node B are other examples of stations that communicate with the UEs.

Each BS 122 or 132 may provide communication coverage for a particular geographic area (e.g., a cell). In 3GPP, the term "cell" can refer to the BS or a coverage area of the BS serving that area, depending on the context in which the term is used. In NR systems, the term "cell", BS, and TRP may be interchangeable.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, an appliance, etc. In aspects, UE 110 may be a Dual SIM dual standby (DSDS) UE.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific according to the UE's location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 100 and may camp on the LTE network while in the idle mode. LTE network 100 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

Figure 2:
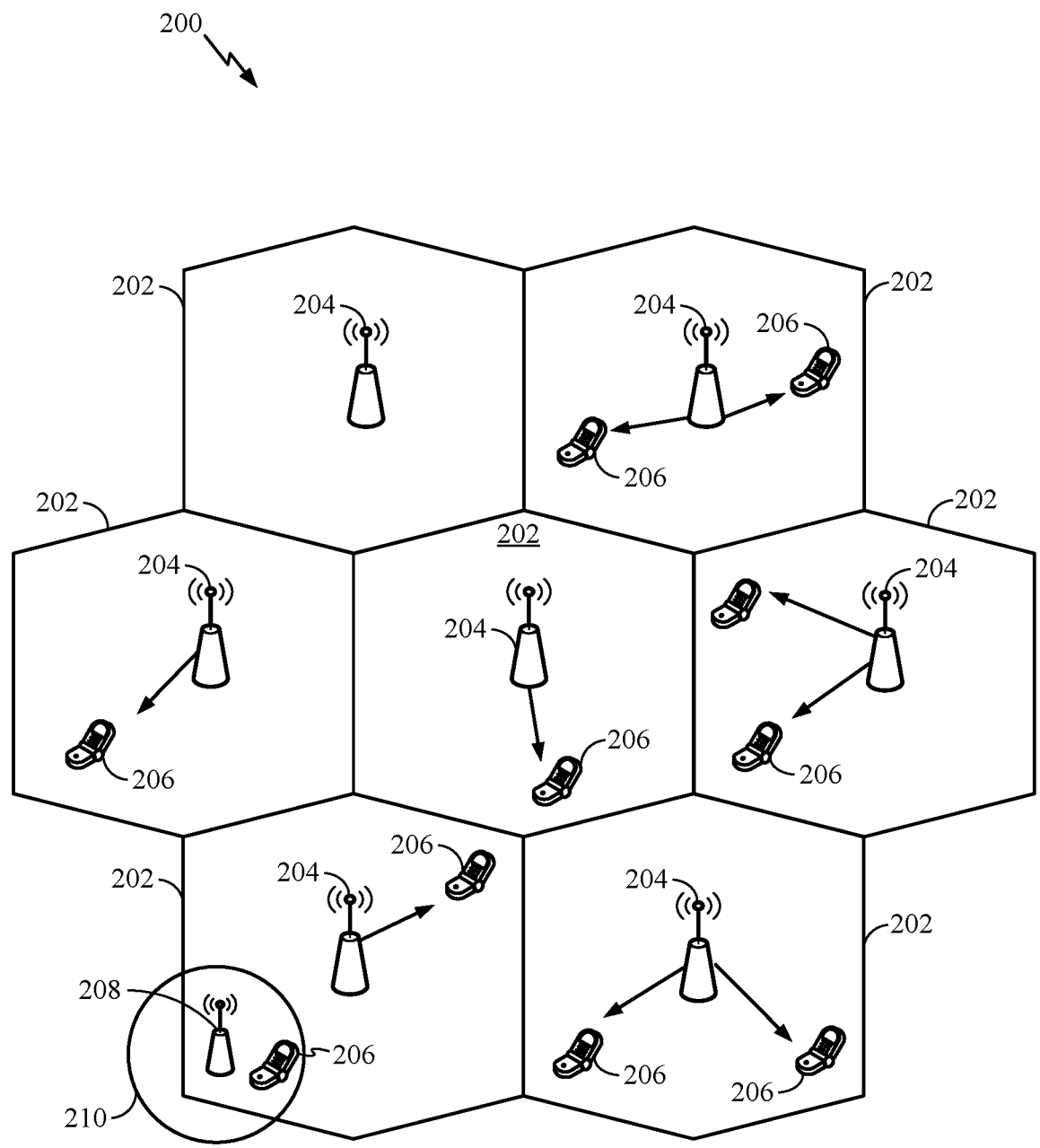
FIG. 2 is a diagram illustrating an example of an access network, in accordance with certain aspects of the disclosure.

FIG. 2 is a diagram illustrating an example of an access network 200. The UE 206 may transmit an uplink reference signal which may be received by both a serving and non-serving BSs. Serving and non-serving BSs 204, 208 may receive the uplink reference signal and either of the BSs may transmit a KA command to the UE based, at least in part, on the uplink reference signal.

In FIG. 2, the access network 200 is divided into a number of cellular regions (cells) 202. One or more lower power class BSs (e.g., Node Bs) 208 may have cellular regions 210 that overlap with one or more of the cells 202. A lower power class BS (e.g., Node B) 208 may be referred to as a remote radio head (RRH). The lower power class BS (e.g., e Node B or eNB) 208 may be a femto cell (e.g., home Node B (H Node B)), pico cell, or micro cell. The macro BS (e.g., Node Bs) 204 are each assigned to a respective cell 202 and are configured to provide an access point to the EPC 110 for all the UEs 206 in the cells 202. There is no centralized controller in this example of an access network 200, but a centralized controller may be used in alternative configurations. The BSs 204 are responsible for all radio related functions including radio bearer control, admission control, mobility control, scheduling, security, and connectivity to the serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE and NR applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The BS 204 may have multiple antennas supporting MIMO technology. The use of MIMO technology enables the BSs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the BS 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
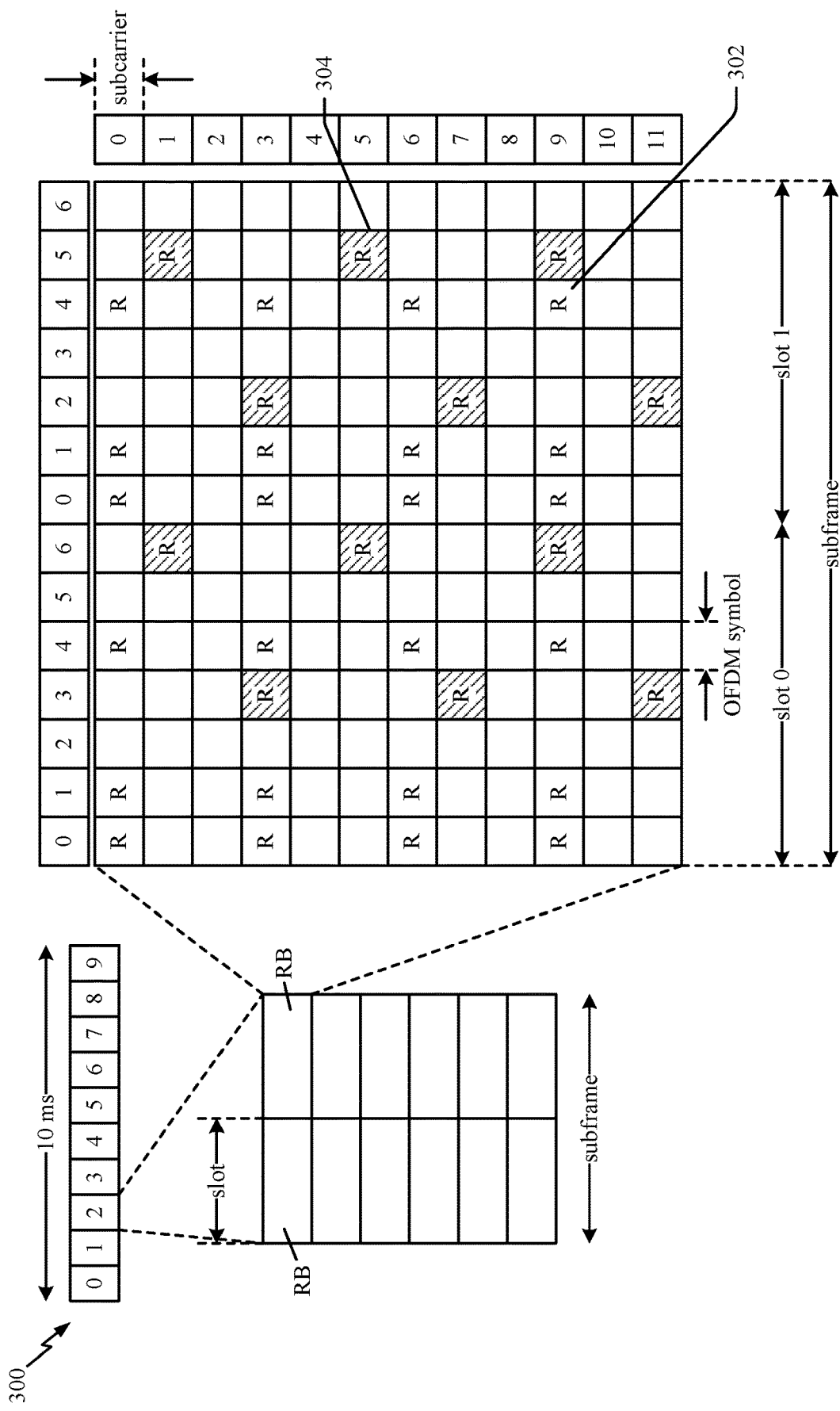
FIG. 3 is a diagram illustrating an example of a DL frame structure in LTE, in accordance with certain aspects of the disclosure.

FIG. 3 is a diagram 300 illustrating an example of a DL frame structure in a telecommunications system (e.g., LTE). A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, a BS may send a primary synchronization signal (PSS) and a secondary synchronization signal (SSS) for each cell in the BS. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The NBSode B may send a Physical Broadcast Channel (PBCH) in symbol periods 0 to 3 in slot 1 of subframe 0. The PBCH may carry certain system information.

The BS may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The BS may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The BS may send a Physical Downlink Shared Channel (PDSCH) in the remaining symbol periods of each subframe. The PDSCH may carry data for UEs scheduled for data transmission on the downlink.

The BS may send the PSS, SSS, and PBCH in the center 1.08 MHz of the system bandwidth used by the BS. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

Figure 4:
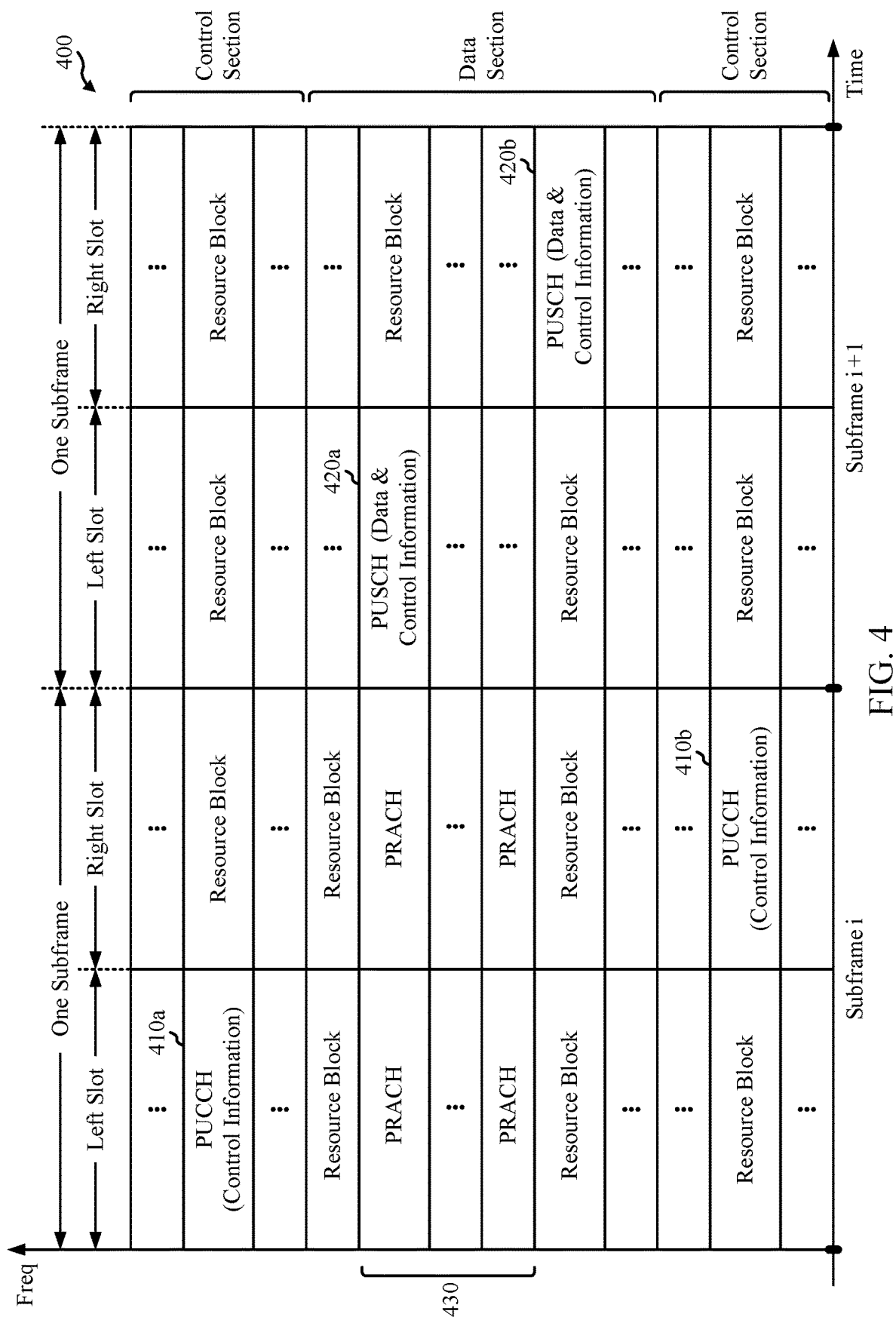
FIG. 4 is a diagram illustrating an example of an UL frame structure in LTE, in accordance with certain aspects of the disclosure.

FIG. 4 is a diagram 400 illustrating an example of an UL frame structure in telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks in the control section to transmit control information to a BS. The UE may also be assigned resource blocks in the data section to transmit data to the BS. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
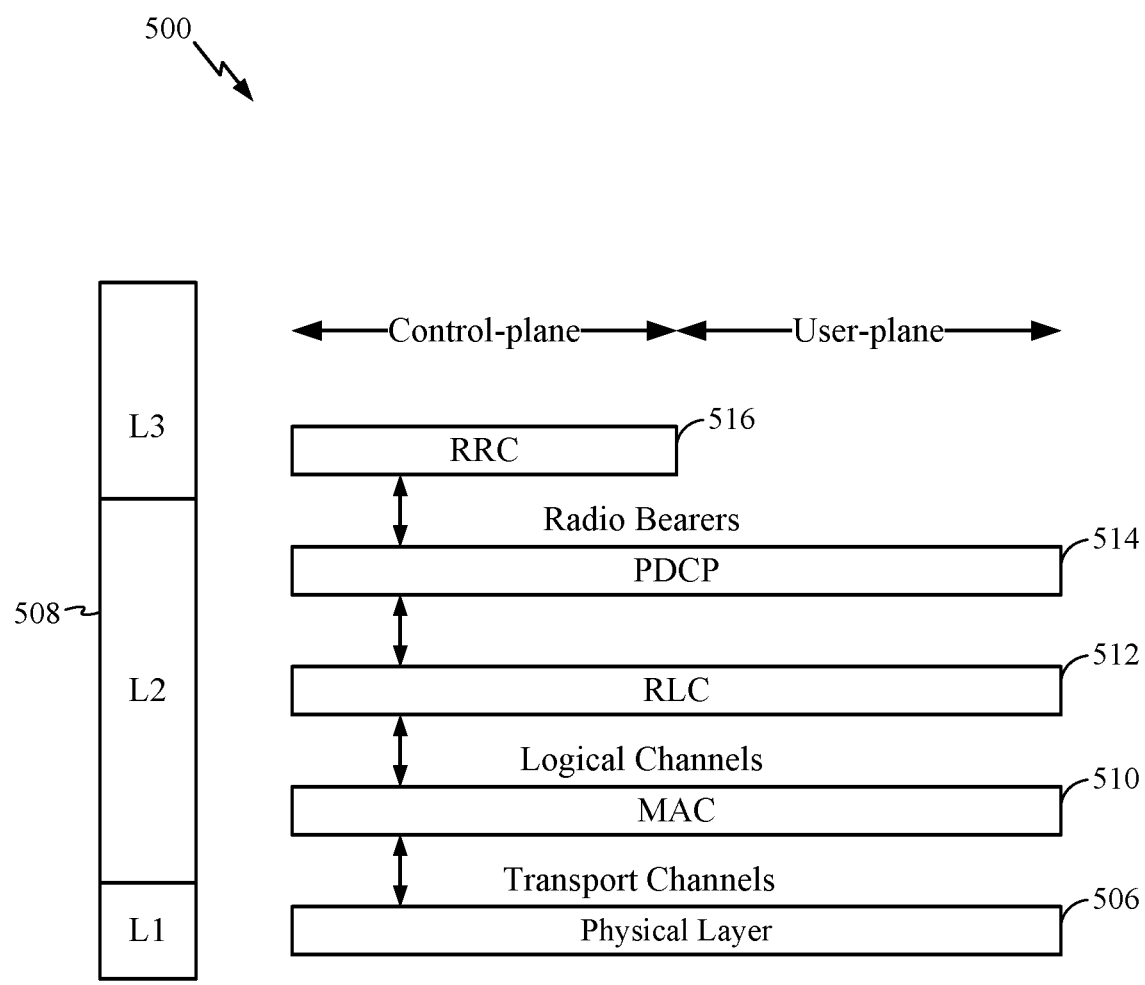
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

Figure 6:
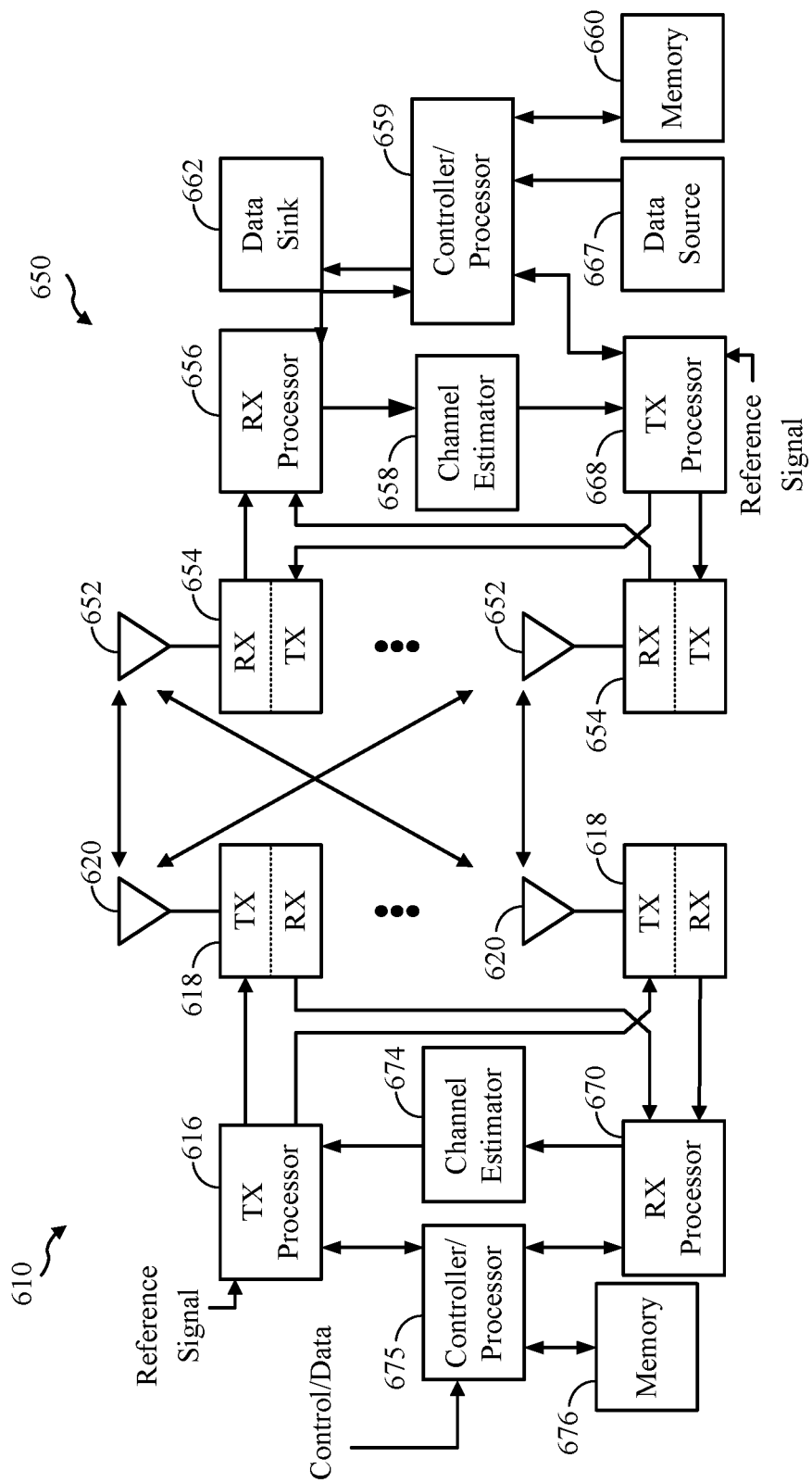
FIG. 6 is a diagram illustrating an example of a BS and user equipment (UE) in an access network, in accordance with certain aspects of the disclosure.

FIG. 6 is a block diagram of BS 610 in communication with a UE 650 in an access network in accordance with aspects of the present disclosure. The BS of FIG. 1 and FIG. 2 may include one or more components of BS 610 illustrated in FIG. 6. Similarly, the UEs illustrated in FIGS. 1 and 2 may include one or more components of UE 650 as illustrated in FIG. 6. One or more components of the UE 650 and BS 610 may be configured to perform the operations described herein and illustrated in the accompanying figures.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the BS 610. These soft decisions may be based on channel estimates computed by the channel estimator 658. The soft decisions are then decoded and deinterleaved to recover the data and control signals that were originally transmitted by the BS 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the BS 610, the controller/processor 659 implements the L2 layer for the user plane and the control plane by providing header compression, ciphering, packet segmentation and reordering, and multiplexing between logical and transport channels based on radio resource allocations by the BS 610. The controller/processor 659 is also responsible for HARQ operations, retransmission of lost packets, and signaling to the BS 610.

Channel estimates derived by a channel estimator 658 from a reference signal or feedback transmitted by the BS 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the BS 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controller/processor 659 may direct the operation at the UE 650. The controller/processor 659 and/or other processors, components, and/or modules at the UE 650 may perform or direct operations performed by the UE as described herein. The controller/processor 675 may direct the operations at the BS 610. The controller/processor 675 and/or other processors, components, and/or modules at the BS 610 may perform or direct operations performed by the BS as described herein. In aspects, one or more of any of the components shown in FIG. 6 may be employed to perform example operations 1000, 1100, 1200, 1300, and 1400 shown in FIGS. 10-14 and other UE and BS operations for the techniques described herein and illustrated in the accompanying figures.

For example, one or more of the antenna 620, transceiver 618, controller/processor, and memory 676 may be configured to receive an uplink reference signal from a UE, measure the uplink reference signal, and transmit a KA command, as described herein. Additionally, one or more of the of the antenna 620, transceiver 618, controller/processor, and memory 676 may be configured to receive an uplink reference signal from a UE, wherein a CP of the uplink reference signal is longer than a CP of another type of reference signal, measure the uplink reference signal, and transmit a KA command to the UE based, at least in part, on the measured uplink reference signal.

One or more of the antenna 652, transceiver 654, controller/processor 659, and memory 660 may be configured to transmit an uplink reference signal, receive a KA command, and take one or more actions to perform a handover in accordance with the KA command, as described herein. Additionally, one or more of the antenna 652, transceiver 654, controller/processor 659, and memory 660 may be configured to transmit an uplink reference signal, wherein a CP of the uplink reference signal is longer than a CP of another type of reference signal, receive a KA command based, at least in part, on the uplink reference signal, and take one or more actions to perform a handover to a non-serving BS in accordance with the KA command.

Example Ran Architecture

Figure 7:
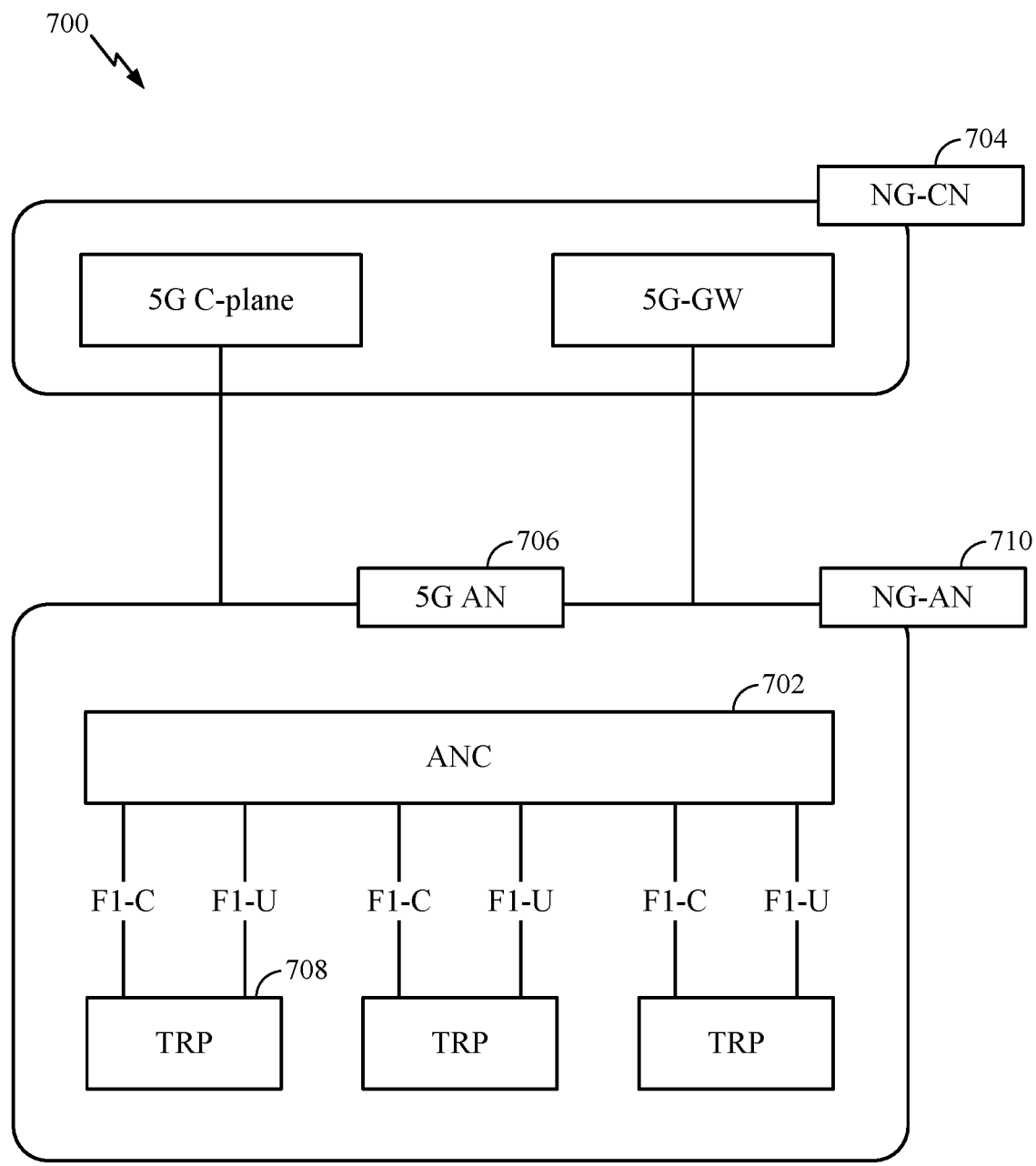
FIG. 7 illustrates a logical architecture of a distributed RAN, according to aspects of the present disclosure.

FIG. 7 illustrates an example logical architecture of a distributed RAN 700, according to aspects of the present disclosure. A 5G access node 706 may include an access node controller (ANC) 702 and one or more TRPs 708. The ANC may be a central unit of the distributed RAN 700. The backhaul interface to the next generation core network (NG-CN) 704 may terminate at the ANC. The backhaul interface to neighboring next generation access nodes (NG-ANs) 710 may terminate at the ANC. The ANC may be coupled to one or more TRPs 708. As described above, a TRP may be used interchangeably with "cell."

The TRPs 708 may be a distributed unit. The TRPs may be connected to one ANC or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 700 may be used to illustrate fronthaul definition. The architecture may be defined to support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to aspects, a 5G AN may serve as a BS and may include a central unit (e.g., ANC 702) and one or more distributed units (e.g., one or more TRPs 708).

Figure 8:
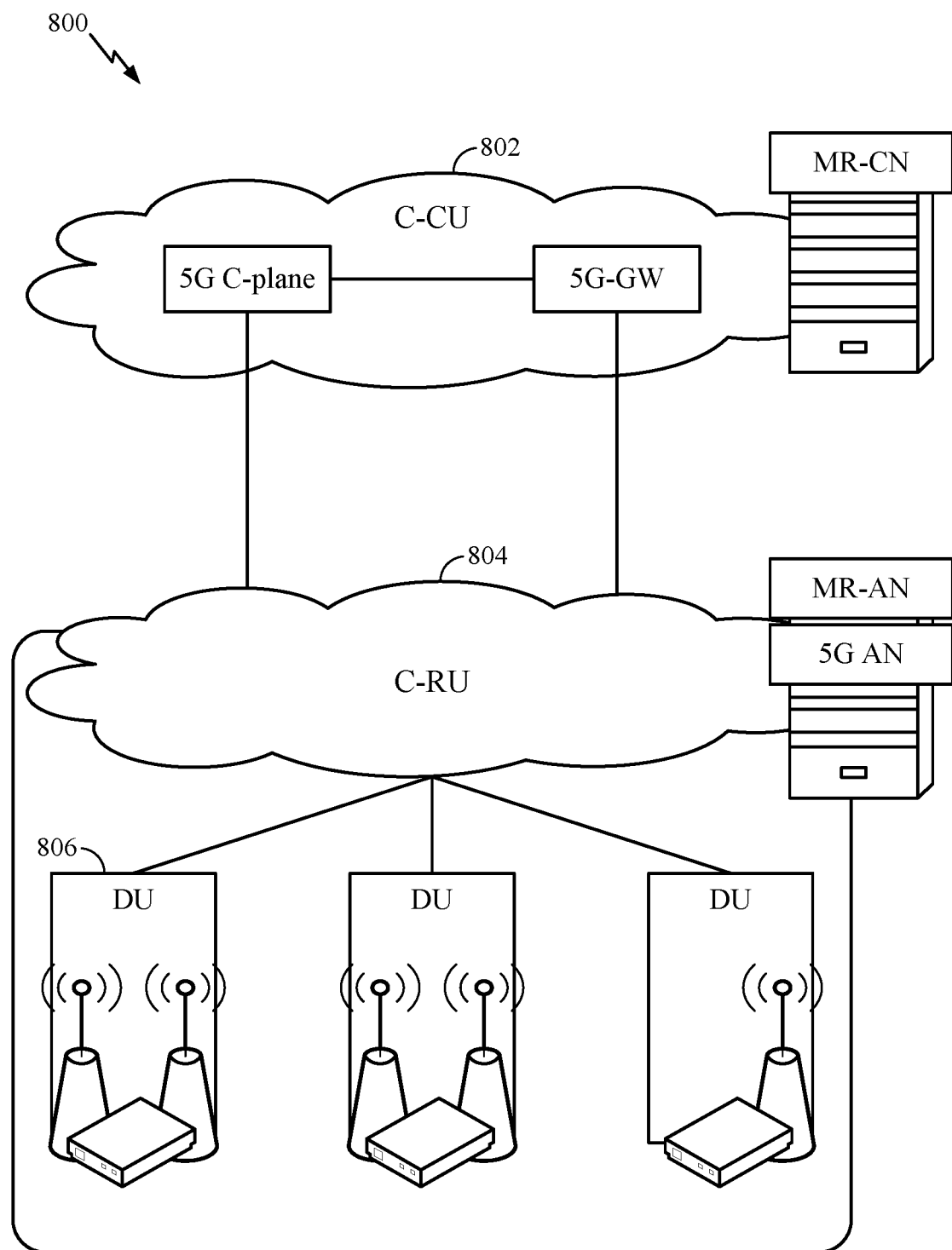
FIG. 8 illustrates an example physical architecture of a distributed RAN, according to aspects of the present disclosure

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 806 may host one or more TRPs. The DU may be located at edges of the network with radio frequency (RF) functionality.

Handover in User Equipment Centric Mobility (UECM)

Figure 9:
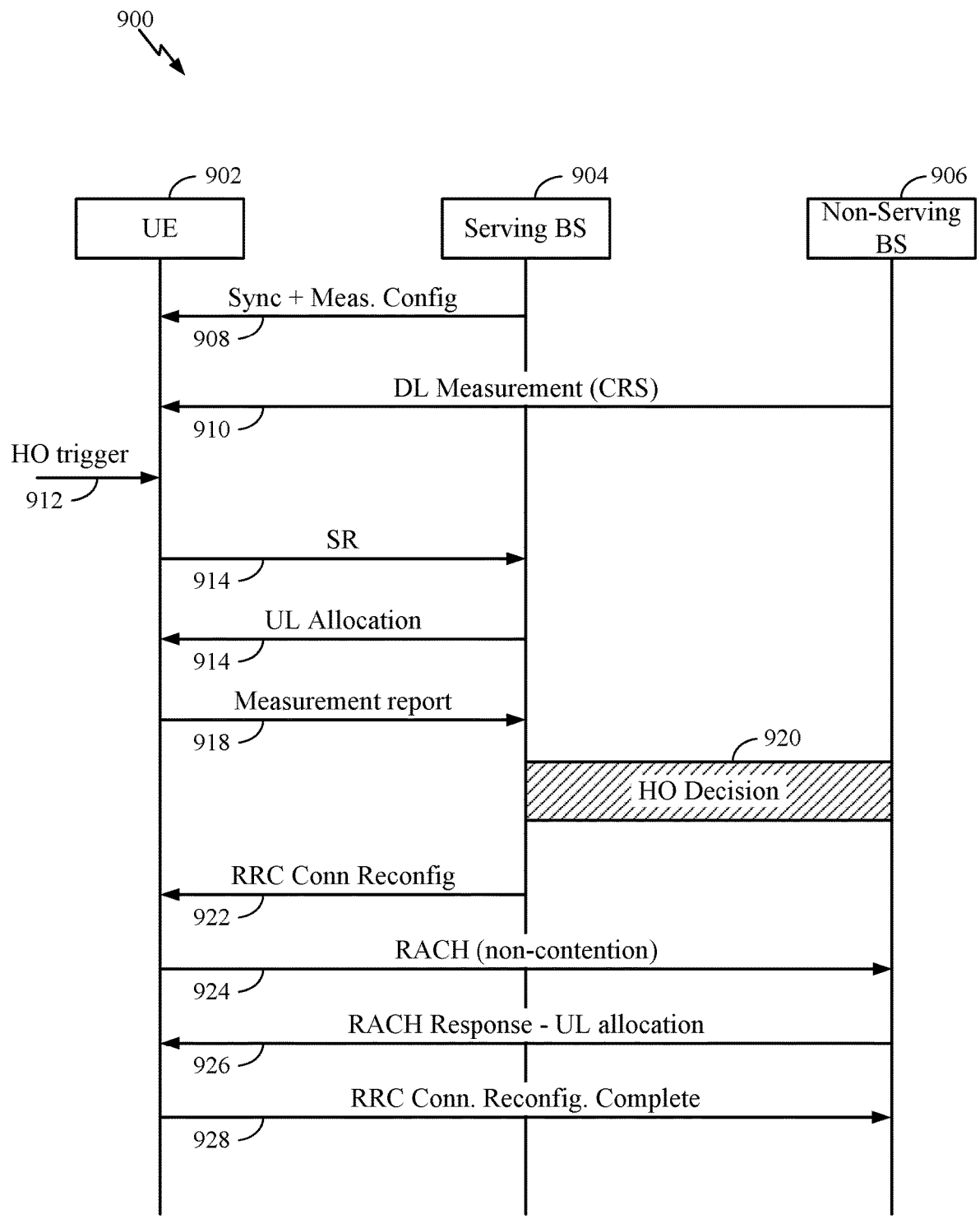
FIG. 9 illustrates an example call-flow diagram for a handover procedure.

FIG. 9 illustrates an example call-flow diagram 900 illustrating operations which may be performed in a handover procedure, according to certain wireless technologies. For example, in a 4G communication system, a UE may be synchronized to a serving BS (e.g., source BS). Similarly, in a 5G communication system a UE 902 may be synchronized to a serving BS (e.g., source BS) 904. At 908, the serving BS may provide (e.g., transmit) a measurement configuration to the UE. The measurement configuration may include one or more of the cells on which the UE may perform measurements, criteria used by the UE to trigger a transmission of a measurement report, and/or the measurements that the UE may perform.

At 910, the UE may measure downlink signals transmitted by a non-serving BS (target BS) 906 according to the received measurement configuration. For example, the UE may measure cell specific reference signals (CRS) transmitted by the non-serving BS in an effort to determine downlink channel quality. A handover trigger 912 may occur based, at least in part, on the UE's measurement of a downlink signal (e.g., CRS). For example, the handover trigger may occur upon determining the downlink channel quality associated with the non-serving BS exceeds the downlink channel quality associated with the serving BS.

In response to the handover trigger, at 914, the UE may transmit a status request (SR) message to the serving BS. The serving BS may transmit an uplink allocation to the UE at 916. The UE may transmit a measurement report at 918 using the received uplink allocation. At 920, the serving BS and non-serving BS may exchange information and make a handover decision regarding the UE based on the received measurement report. Accordingly, the handover decision may be based, at least in part, on downlink signal measurements taken by the UE.

At 922, the serving BS may transmit a RRC connection reconfiguration message, indicating a request to modify an RRC connection and perform a handover to the non-serving BS. After receiving the handover command, the UE may, at 924, perform a random access procedure with the non-serving BS. At 926, the UE may receive a random access response and uplink allocation from the non-serving BS. At 928, the UE may transmit an RRC connection reconfiguration complete message to the non-serving BS, confirming completion of the RRC connection reconfiguration.

As described above, current handover decisions may be based on measurements taken by a UE of received downlink signals. In an effort to perform handovers in a user-centric environment, it may be desirable to perform handovers based, at least in part, on uplink signal measurements taken by BSs. For example, 5G and other future communication systems may focus on creating more user-centric networks. In an effort to facilitate a user-centric network, aspects of the present disclosure provide a framework for handover based on uplink measurements performed by BSs.

Figure 10:
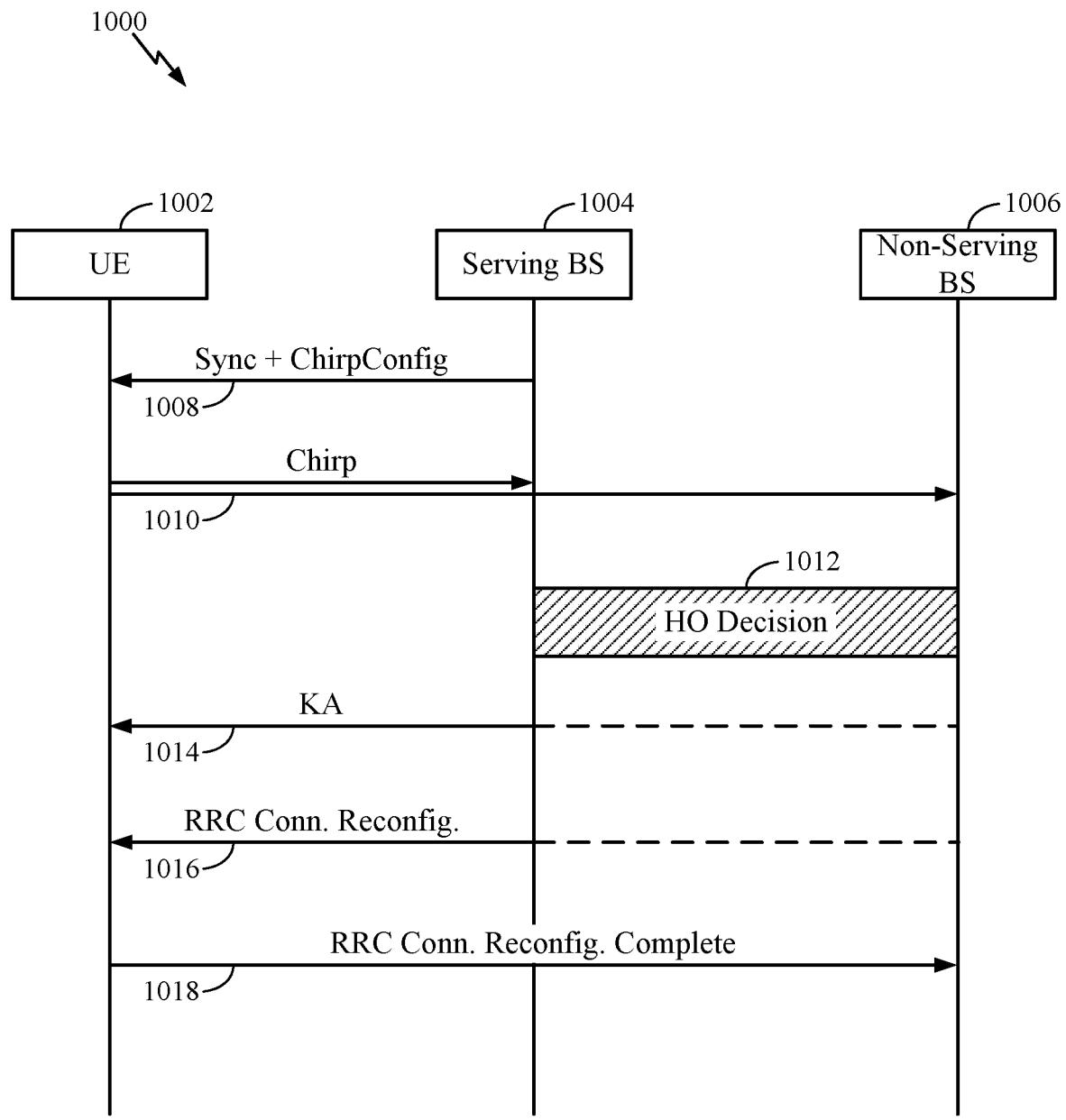
FIG. 10 illustrates an example call-flow diagram for a handover procedure, in accordance with certain aspects of the disclosure.

FIG. 10 illustrates an example call-flow diagram 1000 illustrating operations which may be performed in a handover procedure, according to certain aspects of the present disclosure.

As compared to the handover procedure illustrated in FIG. 9, aspects described herein allow a handover decision to be made based on measurements taken by the serving and non-serving BS of an uplink reference signal transmitted by the UE. In this manner, and as will be described with reference to FIG. 10, the UE may receive a "keep alive" (KA) command from one or more of the serving BS or the non-serving BS, as opposed to receiving the handover command transmitted from the serving BS. Additionally, as will be described with reference to FIG. 10, the UE may receive a RRC connection reconfiguration message from one or more of the serving BS or the non-serving BS (as opposed to receiving the RRC connection reconfiguration message from the serving BS).

With reference to FIG. 10, at 1008, the serving BS 1004 may provide the UE 1002 with a configuration for an uplink reference signal to be transmitted by the UE. This uplink reference signal, referred to as a "chirp signal", may be advantageously received by both the serving BS 1004 and one or more non-serving BSs (target BSs) 1006.

The serving BS 1004 and non-serving BS 1006 may exchange information regarding the UE via an X2 interface or backhaul connection, in an effort to facilitate the non-serving BS detecting the chirp signal transmitted by UE 1002. For example, the non-serving BS may receive a UE ID and/or reference signal configuration (e.g., chirp signal configuration) from the serving BS. In this manner, the non-serving BS may be aware of the UE and may detect the uplink chirp signal transmitted by the UE.

According to aspects, though not illustrated in FIG. 10, power control commands may be received by the UE for the chirp signal. For example, the serving BS may transmit power control commands for the chirp signal in an effort for the non-serving BS to receive the chirp signal transmitted by the UE. The UE may transmit the chirp signal in accordance with the received power control commands.

According to aspects, the chirp signal may include a cyclic prefix (CP) configuration which may assist the non-serving BS in detecting the chirp signal. Since uplink signals may be time-aligned with the serving BS, allowing a special, longer, CP configuration for the chirp signal may increase chances of reception by the non-serving BS. Thus, according to aspects, the chirp signal may include a longer CP than the CP of another uplink reference signal transmitted by the UE and/or the chirp signal may include a longer CP than another reference signal received by the serving and/or non-serving BSs.

At 1010, the UE may transmit a chirp signal, in accordance with the received chirp signal configuration, wherein the chirp signal is capable of being received by both the serving BS and non-serving BSs. The serving BS and non-serving BS may measure the received chirp signal. At 1012, the serving and non-serving BS may collectively decide to handover the UE from the serving BS to the non-serving BS based, at least in part, on measurements of the uplink chirp signal.

At 1014, either the serving or non-serving BS may transmit a KA command to the UE, indicating a handover is to be performed. According to aspects, the KA message may be scrambled by a UE identifier, as opposed to, for example, a cell identification. Scrambling by the UE identifier enables the non-serving BS to transmit the KA command 1014. The KA command may include the non-serving BS's cell identification and/or timing advance (TA). According to aspects, the non-serving BS may determine the TA based on the received chirp signal. Additionally or alternatively, the KA command 1014 may include an uplink/downlink allocation for the non-serving BS and UE. In this manner, the UE may begin communicating with the non-serving BS after receiving the KA command (as opposed to communicating with the non-serving BS after a RACH procedure as illustrated at 924 in FIG. 9).

At 1016, at least one of the serving or non-serving BS may transmit an RRC connection reconfiguration message indicating a request to modify an RRC connection. For example, the BS that initiates the handover may transmit the RRC connection reconfiguration message. At 1018, the UE may transmit an RRC connection reconfiguration complete message to the non-serving BS.

As described above, the chirp signal may be an uplink reference signal transmitted by the UE, which allows the serving BS and one or more non-serving BSs (e.g., one or more potential target BSs) to measure uplink signal strength. The chirp signal may be an RRC dedicated uplink reference signal. According to aspects, the chirp signal may be an uplink wide-band signal.

Aspects described herein allow support for forward and backward handover using an uplink reference signal. For example, a forward handover may refer to a handover where a UE receives the handover command directly from a non-serving BS. According to one example of a forward handover, with reference to FIG. 1, a UE 110 communicating with a serving BS may handover to a non-serving BS without the serving BS first preparing the non-serving BS for the handover. A backward handover may refer to a handover wherein the UE receives a handover command from the serving BS. By using an uplink signal which may be received by both serving and non-serving BSs, aspects of the present disclosure allow handover decisions to be made using measurements of the uplink reference signal.

Figure 11:
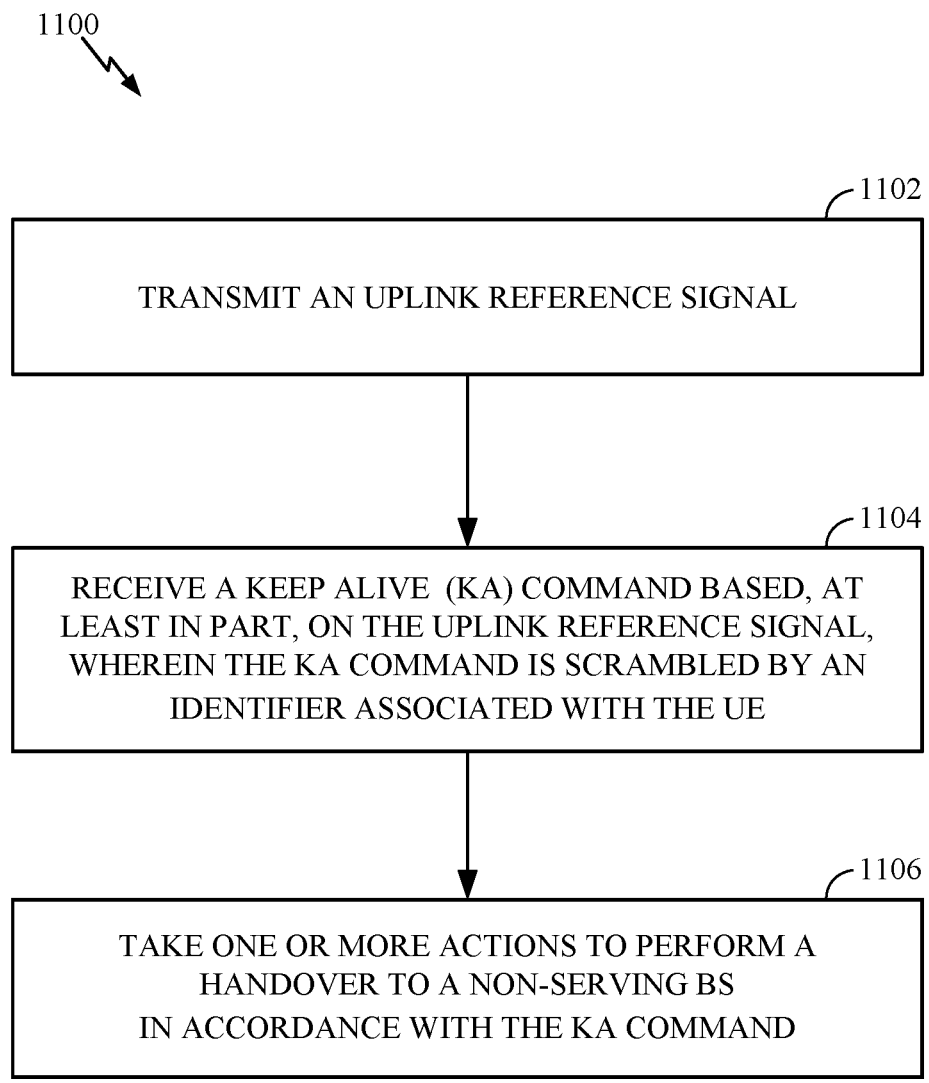
FIG. 11 illustrates example operations, performed by a UE, in accordance with certain aspects of the disclosure.

FIG. 11 illustrates example operations 1100 which may be performed by a UE, according to aspects of the present disclosure. The operations may be performed by one or more components of UE 650 illustrated in FIG. 6. For example, one or more of the antenna 652, transceiver 654, controller/processor 659, and memory 660 may be configured to perform the operations 1100.

At 1102, the UE may transmit an uplink reference signal. At 1104, the UE may receive a KA command based, at least in part, on the uplink reference signal. The KA command may be scrambled by an identifier associated with the UE. At 1106, the UE take one or more actions to perform a handover to a non-serving BS in accordance with the KA command.

As described above, the UE may receive a configuration for the uplink reference signal from a serving BS, wherein the configuration allows the non-serving BS to receive the uplink reference signal. Advantageously, the KA command may be received from a serving BS or a non-serving BS. The KA command may be scrambled by a UE identifier (as opposed to a cell ID). Similar to the KA command, a connection reconfiguration message may be received from one of the serving BS or the non-serving BS.

The KA command may include one or more of a cell identification associated with a non-serving BS, a TA associated with the non-serving BS, or an uplink/downlink resource allocation for communicating with the non-serving BS.

The UE may receive a power control command from the serving BS for the uplink reference signal and may transmit the uplink reference signal in accordance with received power control command.

As described above, a CP of the uplink reference signal may be longer than a CP of another type of reference signal (e.g., another type of uplink or a non-uplink reference signal), in an effort to assist the non-serving BS with detecting the uplink reference signal. Accordingly, the CP of the UL reference signal may be longer than a CP of another UL reference signal that may be received by the non-serving BS.

Figure 12:
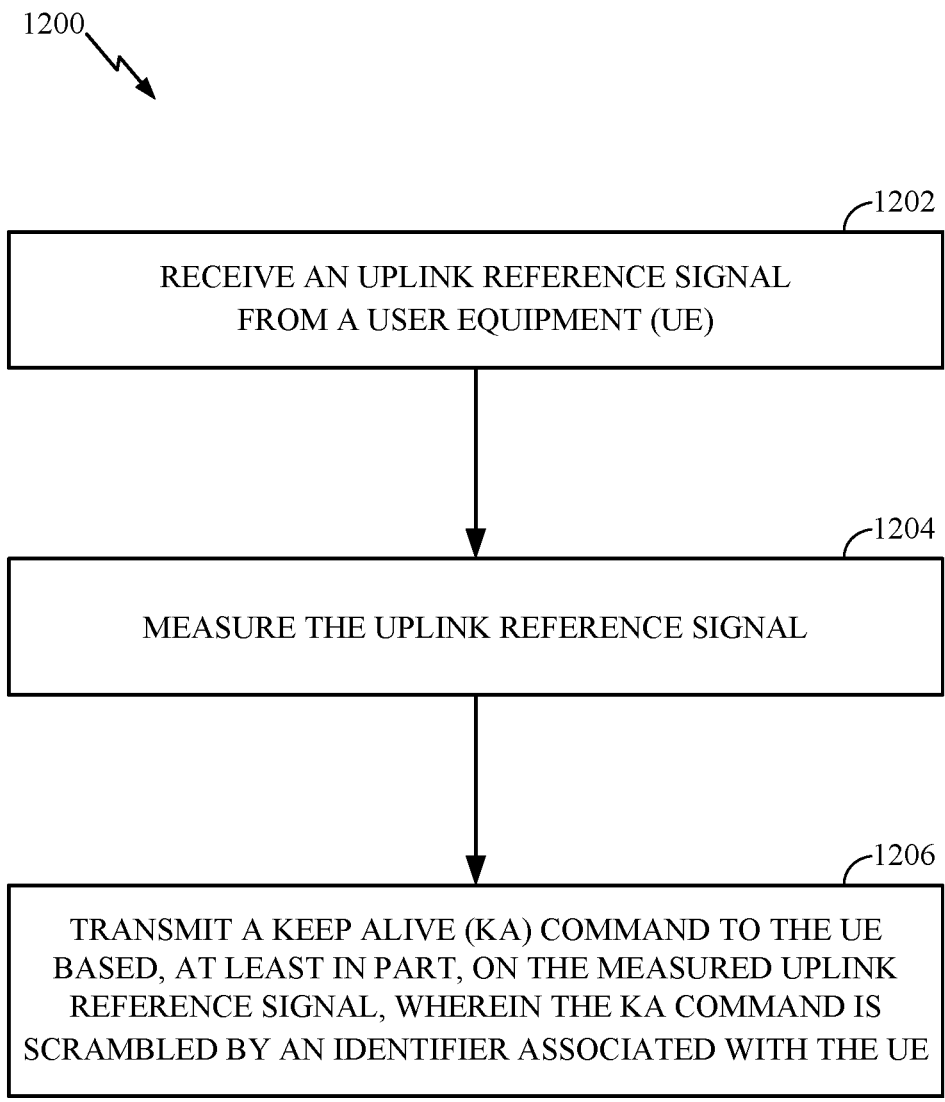
FIG. 12 illustrates example operations, performed by a serving or non-serving BS, in accordance with certain aspects of the disclosure.

FIG. 12 illustrates example operations 1200 which may be performed by a first BS, such as a BS serving a UE or a non-serving BS. The operations may be performed by one or more components of BS 610 illustrated in FIG. 6. For example, one or more of the antenna 620, transceiver 618, controller/processor 675, and memory 676 may be configured to perform the operations 1200.

At 1202, the BS may receive an uplink reference signal from a UE. At 1204, the BS may measure the uplink reference signal. At 1206, the BS may transmit a KA command to the UE based, at least in part, on the measured uplink reference signal, wherein the KA command is scrambled by an identifier associated with the UE.

The KA command may include at least one of a cell identification associated with a non-serving BS, a TA associated with the non-serving BS, or an uplink/downlink resource allocation for communicating with the non-serving BS.

In one aspect, the serving BS may transmit, to the UE, a configuration for the uplink reference signal, wherein the configuration allows a second, non-serving BS to receive the uplink reference signal.

When the first BS is not serving the UE, the first BS may receive, from a second BS serving the UE, a configuration for the uplink reference signal, wherein the configuration allows the first, non-serving BS to receive the uplink reference signal transmitted by the UE.

As described above, either the serving or non-serving BS may transmit a connection reconfiguration message to the UE. According to aspects, a CP of the uplink reference signal may be longer than a CP of another type of reference signal. For example, the CP may be longer than a CP of another type of UL reference signal received by one or more of the serving or non-serving BS.

Figure 13:
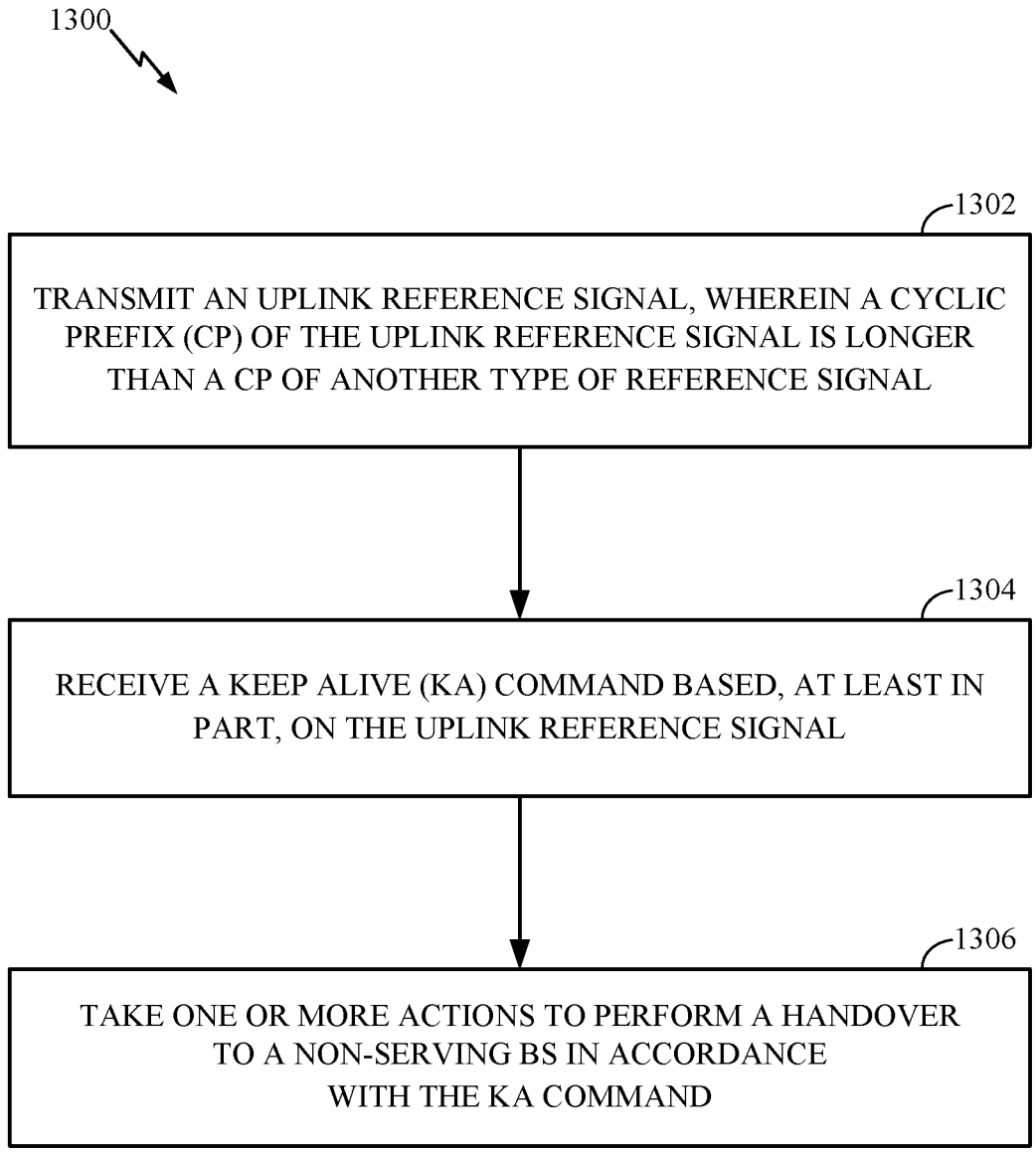
FIG. 13 illustrates example operations, performed by a UE, in accordance with certain aspects of the disclosure.

FIG. 13 illustrates example operations 1300 which may be performed by a UE, according to aspects of the present disclosure. The operations may be performed by one or more components of UE 650 illustrated in FIG. 6. For example, one or more of the antenna 652, transceiver 654, controller/processor 659, and memory 660 may be configured to perform the operations 1300.

At 1302, the UE may transmit an uplink reference signal, wherein a CP of the uplink reference signal is longer than a CP of another type of reference signal (e.g., another type of uplink or a non-uplink reference signal). As described above, according to aspects, the CP of the uplink reference signal may be longer than a CP of another type of uplink reference signal, in an effort to facilitate reception of the uplink reference signal by one or more non-serving BSs.

At 1304, the UE may receive a KA command based, at least in part, on the uplink reference signal. At 1306, the UE may take one or more actions to perform a handover to a non-serving BS in accordance with the KA command.

According to aspects, the UE may receive a configuration for the uplink reference signal from a serving BS, wherein the configuration allows the non-serving BS to receive the uplink reference signal. The KA command, advantageously, may be received from one of a serving BS or the non-serving BS and may be scrambled by an identifier associated with the UE. The KA command may include at least one of a cell identification associated with the non-serving BS, a TA associated with the non-serving BS, or an uplink/downlink resource allocation for communicating with the non-serving BS.

The UE may receive a connection reconfiguration message from one of a serving BS or the non-serving BS.

The UE may receive a power control command from a serving BS for transmitting the uplink reference signal, and the UE may transmit the uplink reference signal in accordance with the received power control command.

Figure 14:
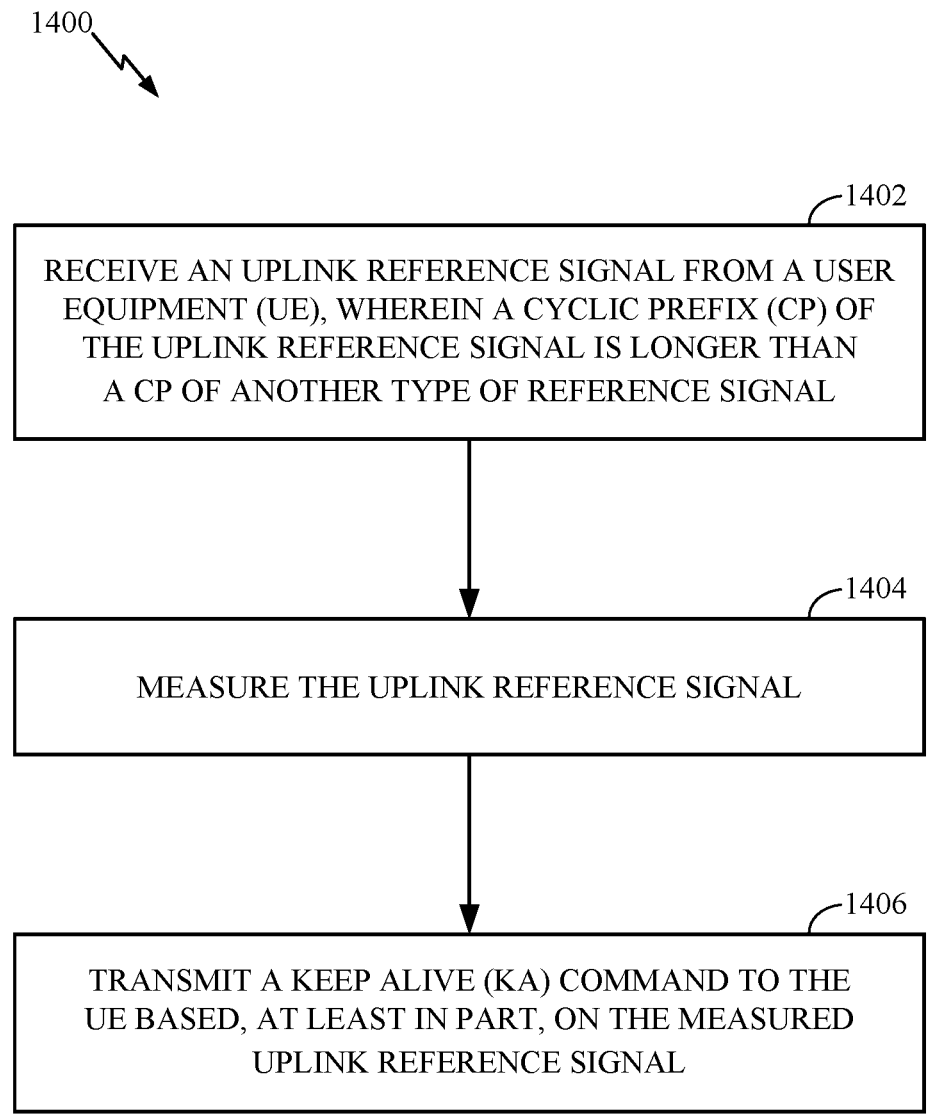
FIG. 14 illustrates example operations, performed by a serving or non-serving BS, in accordance with certain aspects of the disclosure.

FIG. 14 illustrates example operations 1400 which may be performed by a first BS, such as a BS serving a UE or a non-serving BS, according to aspects of the present disclosure. The operations may be performed by one or more components of BS 610 illustrated in FIG. 6. For example, one or more of the antenna 620, transceiver 618, controller/processor 675, and memory 676 may be configured to perform the operations 1400.

At 1402, the BS may receive an uplink reference signal from a UE, wherein a CP of the uplink reference signal is longer than a CP of another type of reference signal (e.g., another type of uplink or a non-uplink reference signal). As described above, according to aspects, the CP of the uplink reference signal may be longer than a CP of another type of uplink reference signal, in an effort to facilitate reception of the uplink reference signal by one or more non-serving BSs. At 1404, the BS may measure the uplink reference signal. At 1406, the BS may transmit a KA command to the UE based, at least in part, on the measured uplink reference signal.

When the first BS is a BS serving the UE, the first BS may transmit, to the UE, a configuration for the uplink reference signal, wherein the configuration allows a second, non-serving BS to receive the uplink reference signal.

When the first BS is a BS not serving the UE, the first BS may receive, from a second BS serving the UE, a configuration for the uplink reference signal, wherein the configuration allows the first BS to receive the uplink reference signal transmitted by the UE.

The KA command may be scrambled by an identifier associated with the UE. The KA command may include at least one of a cell identification associated with the non-serving BS, a TA associated with the non-serving BS, or an uplink/downlink resource allocation for communicating with the non-serving BS.

According to aspects, the serving BS or the non-serving BS may transmit a connection reconfiguration message to the UE.

The serving BS may be configured to transmit to the UE a power control command for the uplink reference signal.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communication by a user equipment (UE), comprising:
   transmitting an uplink reference signal;
   receiving a keep alive (KA) command based, at least in part, on the uplink reference signal, wherein:
   the KA command is scrambled by an identifier associated with the UE;
   the KA command is received from a non-serving base station (BS); and
   the KA command does not comprise a handover command transmitted from a serving BS; and
   taking one or more actions to perform a handover to the non-serving BS in accordance with the KA command.

2. The method of claim 1, wherein the KA command comprises at least one of:
   a cell identification associated with the non-serving BS, a timing advance (TA) associated with the non-serving BS, or an uplink/downlink resource allocation for communicating with the non-serving BS.

3. The method of claim 1, further comprising:
   receiving a configuration for the uplink reference signal from the serving BS, wherein the configuration allows the non-serving BS to receive the uplink reference signal.

4. The method of claim 1, further comprising:
   receiving a connection reconfiguration message from one of the serving BS or the non-serving BS.

5. The method of claim 1, further comprising:
receiving a power control command from the serving BS for the uplink reference signal; and
transmitting the uplink reference signal in accordance with the received power control command.

6. The method of claim 1, wherein a cyclic prefix (CP) of the uplink reference signal is longer than a CP of another type of uplink reference signal.

7. A method for wireless communication by a first base station (BS), comprising:
receiving, from a second BS serving a user equipment (UE), a configuration for an uplink reference signal, wherein the configuration allows the first BS to receive the uplink reference signal;
receiving the uplink reference signal from the UE;
measuring the uplink reference signal; and
transmitting a keep alive (KA) command to the UE based, at least in part, on the measured uplink reference signal, wherein:
the KA command is scrambled by an identifier associated with the UE;
the first BS comprises a non-serving BS; and
the KA command does not comprise a handover command transmitted from the second BS.

8. The method of claim 7, wherein the KA command comprises at least one of:
a cell identification associated with the first BS, a timing advance (TA) associated with the first BS, or an uplink/downlink resource allocation for communicating with the first BS.

9. A method for wireless communication by a first base station (BS), comprising:
receiving an uplink reference signal from a user equipment (UE);
measuring the uplink reference signal; and
transmitting a keep alive (KA) command to the UE based, at least in part, on the measured uplink reference signal, wherein:
the KA command is scrambled by an identifier associated with the UE;
the KA command comprises at least one of: a cell identification associated with a non-serving BS, a timing advance (TA) associated with the non-serving BS, or an uplink/downlink resource allocation for communicating with the non-serving BS;
the non-serving BS comprises the first BS; and
the KA command does not comprise a handover command transmitted from a serving BS.

10. The method of claim 7, further comprising:
transmitting a connection reconfiguration message to the UE.

11. The method of claim 7, further comprising:
transmitting, to the UE, a power control command for the uplink reference signal.

12. The method of claim 7, wherein a cyclic prefix (CP) of the uplink reference signal is longer than a CP of another type of uplink reference signal.

13. An apparatus for wireless communication by a user equipment (UE), comprising:
at least one processor configured to:
transmit an uplink reference signal;
receive a keep alive (KA) command based, at least in part, on the uplink reference signal, wherein:
the KA command is scrambled by an identifier associated with the UE;
the KA command is received from a non-serving base station (BS); and
the KA command does not comprise a handover command transmitted from a serving BS; and
take one or more actions to perform a handover to the non-serving BS in accordance with the KA command; and
a memory coupled with the at least one processor.

14. The apparatus of claim 13, wherein the KA command comprises at least one of:
a cell identification associated with the non-serving BS, a timing advance (TA) associated with the non-serving BS, or an uplink/downlink resource allocation for communicating with the non-serving BS.

15. The apparatus of claim 13, wherein the at least one processor is configured to:
receive a configuration for the uplink reference signal from the serving BS, wherein the configuration allows the non-serving BS to receive the uplink reference signal.

16. The apparatus of claim 13, wherein the at least one processor is configured to:
receive a connection reconfiguration message from one of the serving BS or the non-serving BS.

17. The apparatus of claim 13, wherein a cyclic prefix (CP) of the uplink reference signal is longer than a CP of another type of uplink reference signal.

18. An apparatus for wireless communication by a first base station (BS), comprising:
means for receiving, from a second BS serving a user equipment (UE), a configuration for an uplink reference signal, wherein the configuration allows the first BS to receive the uplink reference signal;
means for receiving the uplink reference signal from the UE;
means for measuring the uplink reference signal; and
means for transmitting a keep alive (KA) command to the UE based, at least in part, on the measured uplink reference signal, wherein:
the KA command is scrambled by an identifier associated with the UE;
the first BS comprises a non-serving BS; and
the KA command does not comprise a handover command transmitted from the second BS.

19. The apparatus of claim 18, wherein the KA command comprises at least one of:
a cell identification associated with the first BS, a timing advance (TA) associated with the first BS, or an uplink/downlink resource allocation for communicating with the first BS.

20. An apparatus for wireless communication by a first base station (BS), comprising:
means for receiving an uplink reference signal from a user equipment (UE);
means for measuring the uplink reference signal; and
means for transmitting a keep alive (KA) command to the UE based, at least in part, on the measured uplink reference signal, wherein:
the KA command is scrambled by an identifier associated with the UE;
the KA command comprises at least one of: a cell identification associated with a non-serving BS, a timing advance (TA) associated with the non-serving BS, or an uplink/downlink resource allocation for communicating with the non-serving BS;
the non-serving BS comprises the first BS; and
the KA command does not comprise a handover command transmitted from a serving BS.

21. The apparatus of claim 18, further comprising:
means for transmitting a connection reconfiguration message to the UE.

22. The apparatus of claim 18, wherein a cyclic prefix (CP) of the uplink reference signal is longer than a CP of another type of uplink reference signal.

* * * * *